United States Patent

Meyers

[15] 3,664,130
[45] May 23, 1972

[54] HYDRAULIC BRAKE PRESSURE LIMITING DEVICE

[72] Inventor: Robert E. Meyers, South Bend, Ind.
[73] Assignee: The Bendix Corporation
[22] Filed: Nov. 16, 1970
[21] Appl. No.: 89,725

[52] U.S. Cl............................60/54.5 P, 303/21 F, 91/433
[51] Int. Cl. ....................F15b 7/00, F15b 11/10, B60t 8/06
[58] Field of Search..............60/54.5; 303/21 F, 61; 91/433

[56] References Cited

UNITED STATES PATENTS

| 3,578,820 | 5/1971 | Riordan | 303/21 F |
| 2,904,960 | 9/1959 | Aikman | 60/54.6 P |
| 3,559,532 | 2/1971 | Mac Duff | 303/21 F |
| 2,747,697 | 5/1956 | Banker | 303/21 F |

FOREIGN PATENTS OR APPLICATIONS 1,032,578  6/1966  Great Britain..........................303/21F Primary Examiner—Martin P. Schwadron
Assistant Examiner—A. M. Zupac
Attorney—W. N. Antonis and Plante, Hartz, Smith and Thompson

[57] ABSTRACT

A pressure limiting device is provided which prevents the output pressure from a power braking system from exceeding the brake line pressure capacity. During normal brake application the pressure limiting device does not function. If hydraulic boost pressure combined with manual operator input force become too great, and brake line pressure exceeds a predetermined value which threatens to rupture the brake line hoses, the limit device functions to prevent further system pressure buildup.

8 Claims, 2 Drawing Figures

INVENTOR
ROBERT E. MEYERS
BY
Plante, Hartz, Smith & Thompson
ATTORNEYS

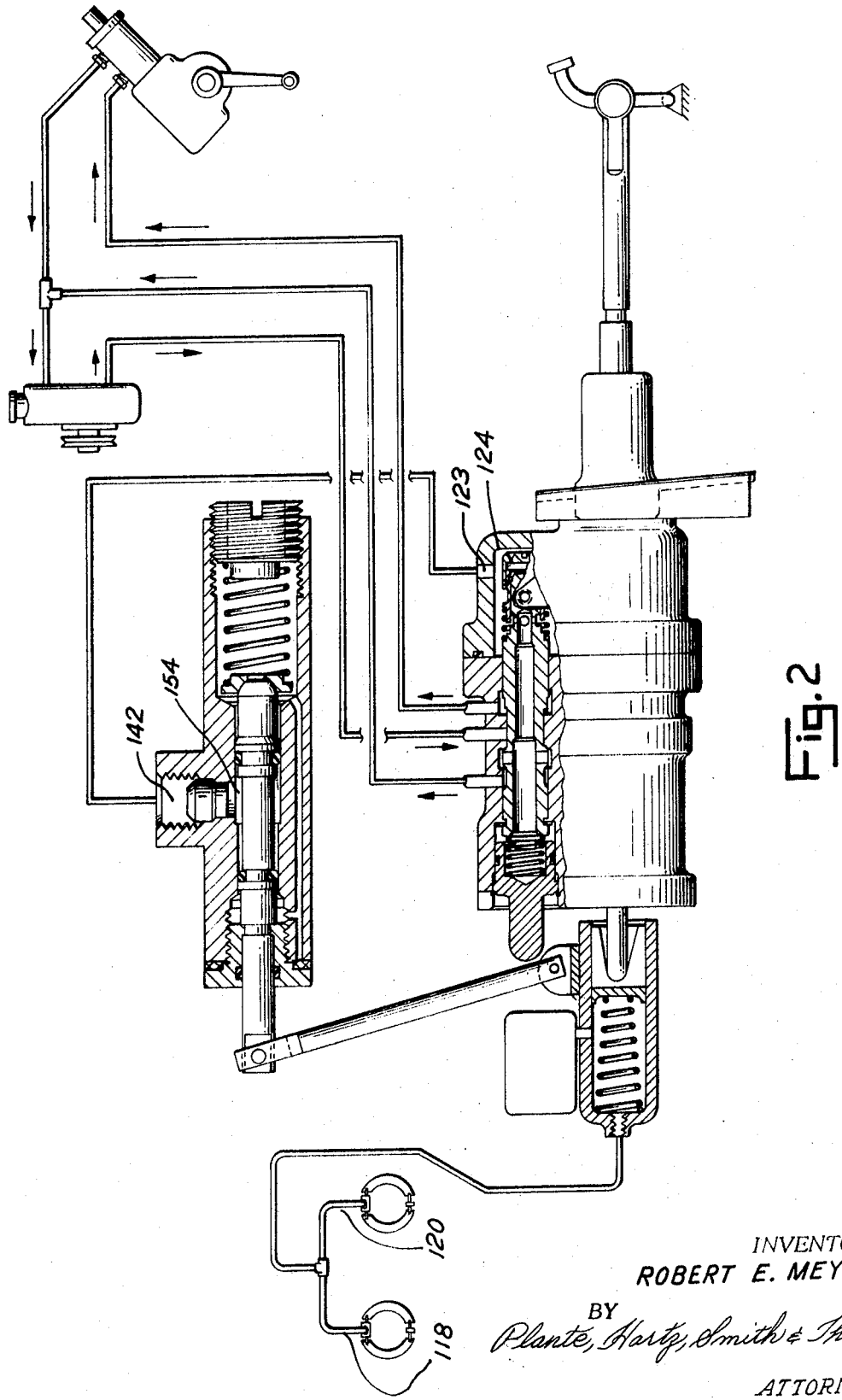

HYDRAULIC BRAKE PRESSURE LIMITING DEVICE

BACKGROUND OF THE INVENTION

This invention relates to a brake pressure limiting device for use with a vehicular braking system.

Use of many existing brake pressure boosting devices utilizing mechanical, pneumatic, or hydraulic motive power sources, often cause such braking systems to be subjected to very high pressures during emergency braking applications, often much in excess of that needed to completely lock the wheels of the vehicle. Small input pressures by the vehicle operator at the brake pedal are multiplied many times by the pressure boosting device, thus sometimes causing brake line pressures to be precariously near or over the pressure capacities of the brake line hoses. Excessive brake line pressure can rupture them and result in hydraulic fluid loss and attendant loss of braking capability. It is therefore, desirable to provide a pressure limiting device which, when actuated, will prevent any further output line pressure buildup regardless of the amount of additional pedal pressure applied to the brakes by the driver; such pressure limit being well in excess of that required to completely lock the wheels of the vehicle under ideal braking conditions.

SUMMARY OF THE INVENTION

It is an object of this invention to provide a pressure limiting device for a vehicular braking system which, upon actuation at a predetermined brake system pressure, or booster pressure which is a function thereof, will prevent excessive brake system pressure buildup, regardless of whether additional brake pedal input force is applied, so that brake line hose rupture is avoided.

Another object of this invention is to provide a vehicular braking system with a brake line pressure limiting device which has a minimum of parts coupled with reliable operation and simplified construction.

Another object of this invention is to provide a brake line pressure limiting device which can be mounted remotely from other equipment for easy repair, replacement or maintenance access.

Still another object of the present invention is to effectively limit pressure of one fluid upon signal from a second fluid in a two-fluid system without danger of intermixing of the two fluids.

BRIEF DESCRIPTION OF THE DRAWINGS

FIG. 2 is a similar view showing another embodiment of my invention.

DESCRIPTION OF THE PREFERRED EMBODIMENT

Figure 1:
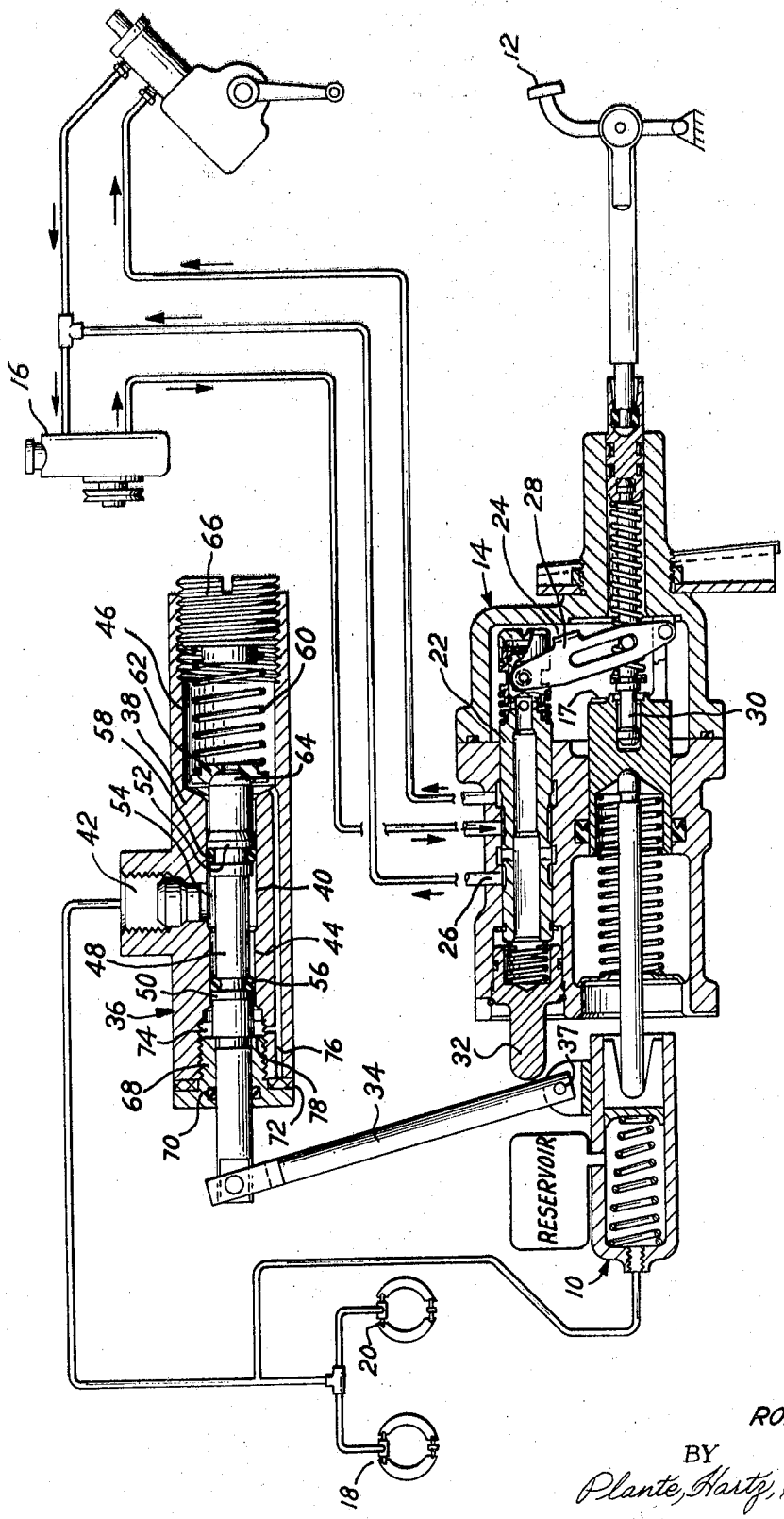
FIG. 1 is a sectional view of my pressure limiting device shown in conjunction with a hydraulic brake booster and associated components of a hydraulic braking system.

Referring now to FIG. 1 fluid pressure is developed in a master cylinder 10 by manually operating a brake pedal 12 which actuates a hydraulic brake booster 14 deriving its motive power from hydraulic pump 16. Master cylinder 10 could be either of the single or split system type for developing pressure in front and rear braking systems 18 and 20, respectively. Located in the brake booster 14 is a spool valve 22 which regulates the pressure in booster chamber 24 and thus the magnitude of hydraulic boost assistance by slidably opening and restricting fluid return port 26. This pressure then acts on booster piston 17 to assist the vehicle operator in his efforts to apply the brakes. Lever arm 28, transmits linear motion of the push rod 30 to the spool valve 22 upon operation of pedal 12. Spool valve 22 has an extension 32 which protrudes from the booster for engagement with linkage 34 as brake line pressures in the braking systems 18 and 20, dictate. Linkage 34 is connected at one end with a brake line pressure limiting device 36 and at the other end with fixed pivot 37.

The pressure limiting device 36 includes a housing 38 having a first bore 40 therewithin which communicates with a fluid passage 42 and a spring chamber 46. A second reduced diameter bore 44 also communicates with bore 40. A piston 48 has a pair of opposing secondary and primary faces 50 and 52, respectively, which have differing effective surface areas and which, in conjunction with bores 40 and 44 form a pressure chamber 54. Suitable seals 56 and 58 are provided adjacent the piston face 50 and the piston face 52, respectively, to prevent the escape of fluid from the chamber 54. Return spring 60 is located in spring chamber 46 and presses against a spring seat 62 which in turn abuts the universal end 64 of piston 48. A plug 66 confines the return spring 60 in the spring chamber 46 and provides actuating pressure adjustment for the pressure limiting device 36, by varying the preload on the return spring 60. Gland 68 guides piston 48 and together with packing 70, seals the piston bore 44 from atmospheric contamination. Breather 72 prevents any undesirable pressure or vacuum buildup tending to cause seal 56 to leak. The cavity 74 and spring chamber 46 communicates with atmospheric pressure through the breather 72 and air passage 76. Piston 48 has a shoulder 78 which abuts against the end of gland 68 when the pressure limiting device is not functioning.

MODE OF OPERATION OF THE PREFERRED EMBODIMENT

If there is no overpressure in the brake systems 18 and 20 and the pressure chamber 54 which communicates therewith through fluid passage 42, the piston 48 will be held against gland 68 at shoulder 78 by return spring 60. Linkage 34 will be positioned away from spool valve extension 32 and the spool valve 22 will be free to slidably function as necessary to admit hydraulic fluid boost pressure from pump 16 to the boost chamber 24 which then in turn exerts a force on the piston 17 to assist the vehicle operator in applying the vehicle brakes.

However, when the pressure in the brake systems 18 and 20 and the pressure chamber 54 exceeds a predetermined value, the force exerted against piston face 52 less than that exerted against piston face 50 will become great enough to overcome the thrust of the return spring 60, thereby causing the piston 48 to move to the right as viewed in FIG. 1. Linkage 34, which is connected to the piston 48, will then pivot about point 37 and cause the spool valve extension 32 and the spool valve 22 to move toward the right, as viewed in FIG. 1, thus preventing any further restriction of the return port 26 so that the pressure in the boost chamber 24 can increase no more regardless of any additional effort exerted by the vehicle operator on the brake pedal 12.

If the vehicle operator should manually exert a higher force which threatens to rupture the brake lines, the piston 48 will move still further to the right, as viewed in FIG. 1, and, as previously explained, will cause further pivoting of linkage 34 about pivot 37 and further movement of the spool 32 to the right. The pressure in boost chamber 24 will, therefore, be further reduced and will provide a lower force on booster piston 17, so that the additional input force by the vehicle operator will be effectively offset by the decrease in hydraulic boost assistance, thereby preventing rupturing of the brake lines by limiting the pressure therein. As the brake line pressures are restored to normal, spring 60 will cause the piston 48 to move back to the left, as viewed in FIG. 1, thus moving linkage 34 out of contact with the spool valve extension 32 so that the spool valve will again be free to modulate the boost chamber pressure and thus regulate the amount of power assistance given to the vehicle operator in applying the brakes, depending upon the force exerted against the pedal.

DESCRIPTION OF THE ALTERNATE EMBODIMENT

Referring to FIG. 2, it will be seen that the mechanism operates identically with that illustrated in FIG. 1 and that analogous parts are designated by like numerals plus 100. The distinction lies in that pressure from the hydraulic boost chamber 124 is communicated to the pressure chamber 154 of the pressure limiting device via passages 123 and 142 instead of pressure from the brake systems 118 and 120.

MODE OF OPERATION OF THE ALTERNATE EMBODIMENT

Operation of the alternate embodiment is precisely the same as that of the preferred embodiment with the exception that the pressure limiting device reacts to a predetermined overpressure in the hydraulic boost chamber to prevent any further pressure increase in the boost chamber.

I claim:

1. In a braking system having hydraulic brake means, operator-operated means for activating said brake means, and hydraulic power boost means interposed therebetween for providing power assist to said operator, a pressure limiting device comprising:
   a housing having pressure responsive means located therein, said pressure responsive means being operatively connected to one of said hydraulic means and being movably responsive to hydraulic pressures therein above a predetermined value; and
   lever means operatively connected to said pressure responsive means and to said power boost means for limiting the output of said power boost means upon movement of said pressure responsive means.

2. A pressure limiting device, as defined in claim 1, wherein said pressure responsive means is operatively connected to said hydraulic brake means.

3. A pressure limiting device, as defined in claim 1, wherein said pressure responsive means is operatively connected to said hydraulic power boost means.

4. A pressure limiting device, as defined in claim 1, wherein said housing includes a fluid passage, a first bore, and a second bore having a different diameter communicating with said first bore;
   said pressure responsive means includes a piston slidably mounted in said first and second bores having a pair of opposed faces with unequal surface areas;
   said first and second bores and said opposed faces comprising a chamber communicating with said fluid passage.

5. A pressure limiting device, as defined in claim 4, wherein:
   said power boost means includes a valve for controlling the power output thereof;
   said lever means being operatively connected to said piston for controlling movement of said valve.

6. A pressure limiting device, as defined in claim 1, which includes resilient means located in said housing for opposing movement of said pressure responsive means, and adjustment means operatively connected to said resilient means for varying said predetermined value.

7. A pressure limiting device as claimed in claim 5, wherein said lever means has one end thereof attached to said piston and the other end thereof pivotally connected to a fixed point, and said valve includes a projection for engagement with said lever means intermediate the ends thereof.

8. A pressure limiting device as defined in claim 6 wherein said adjustment means includes a plug threadedly installed in said housing and abutting said resilient means for varying the preload exerted thereby.

* * * * *